United States Patent [19]

Roettger et al.

[11] Patent Number: 5,169,415
[45] Date of Patent: Dec. 8, 1992

[54] METHOD OF GENERATING OXYGEN FROM AN AIR STREAM

[75] Inventors: Belinda F. Roettger; Richard W. Reynolds; Patrick D. Curran, all of Rockford, Ill.

[73] Assignee: Sundstrand Corporation, Rockford, Ill.

[21] Appl. No.: 575,586

[22] Filed: Aug. 31, 1990

[51] Int. Cl.$^5$ .............................. B01D 59/10
[52] U.S. Cl. .............................. 55/68; 55/2; 55/16; 55/158; 55/268; 55/523; 204/129; 204/252; 60/39.07; 454/76
[58] Field of Search ............... 55/2, 16, 60, 158, 268, 55/523; 60/39.07; 98/1.5; 204/129, 252; 454/76

[56] References Cited

U.S. PATENT DOCUMENTS

| | | | |
|---|---|---|---|
| 2,609,059 | 9/1952 | Benedict | 183/2 |
| 3,250,080 | 5/1966 | Garwin | 62/24 |
| 4,508,548 | 4/1985 | Manatt | 55/158 |
| 4,560,394 | 12/1985 | McDonald et al. | 55/16 |
| 4,681,602 | 7/1987 | Glenn et al. | 55/21 |
| 4,810,265 | 3/1989 | Lagree et al. | 55/68 |
| 4,859,296 | 8/1989 | Marianowski | 204/129 |
| 4,877,506 | 10/1989 | Fee et al. | 204/242 |
| 4,879,016 | 11/1989 | Joshi | 204/242 |
| 5,034,023 | 7/1991 | Thompson | 55/523 |

OTHER PUBLICATIONS

D. R. Griffiths, "Navy to Test On-Board Oxygen Generator", Feb. 3, 1989, pp. 56-57.

Primary Examiner—Bernard Nozick
Attorney, Agent, or Firm—Marshall, O'Toole, Gerstein, Murray & Bicknell

[57] ABSTRACT

A system and method of separating the gaseous components of air to provide an oxygen-enriched gas stream and a nitrogen-enriched gas stream are disclosed. The on-board gas generation system and method generate an oxygen-enriched stream including substantially pure oxygen, such as about 99% or greater oxygen, and, if desired, having a pressure of up to about 10,000 pounds per square inch, thereby eliminating the need for a separate compressor to compress the oxygen-enriched gas stream. The on-board oxygen generation system and method are used in enclosed vehicles, like aircraft and military tanks, to supply substantially pure oxygen for breathing, especially at high altitudes and in contaminated atmospheres. The system includes an oxygen separator, such as a ceramic-type oxygen separator, to derive compressed or uncompressed, substantially pure oxygen from feed air provided to the oxygen separator, without the use of a compressor; and means coupled between the oxygen separator and an enclosed space on the enclosed vehicle, such as the cockpit or the cabin, for delivering the oxygen to the enclosed space, whereby such oxygen is used for breathing by the crew or the passengers in the enclosed space.

17 Claims, 1 Drawing Sheet

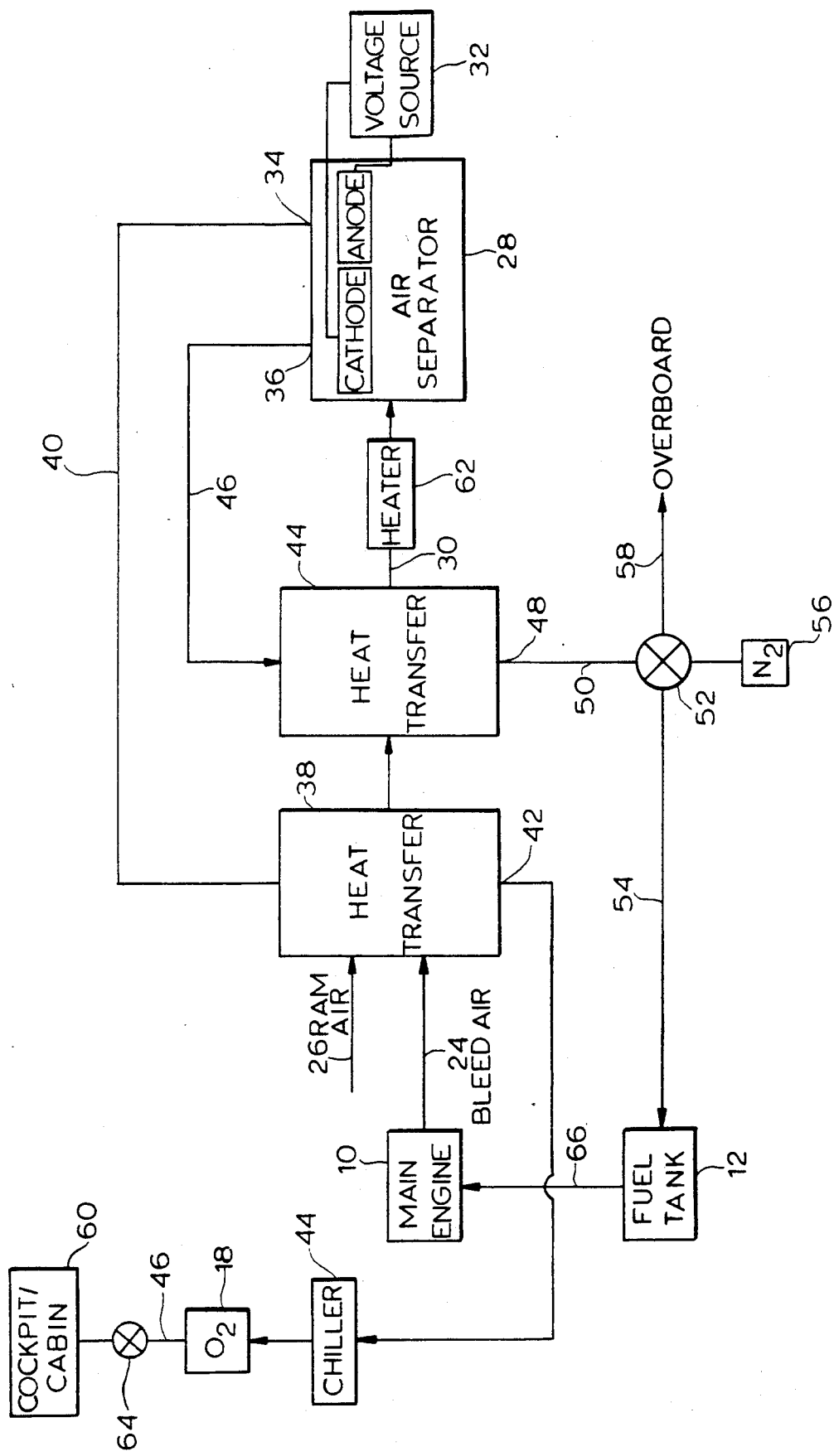

METHOD OF GENERATING OXYGEN FROM AN AIR STREAM

TECHNICAL FIELD

The present invention generally relates to the continuous generation of compressed or uncompressed oxygen from a stream of inlet air, and more particularly relates to separating substantially pure and compressed or uncompressed oxygen from an air stream on an enclosed vehicle, such as an aircraft or a military terrestrial vehicle. The substantially pure and compressed oxygen can be used at high altitudes or in a contaminated atmosphere as an oxygen supply for the crew or passengers of the enclosed vehicle.

BACKGROUND OF THE INVENTION

Oxygen-enriched air and nitrogen-enriched air are required on enclosed vehicles for a wide range of applications. In aircraft, oxygen-enriched air, for example, is used for crew or passenger breathing, for starting the engine of emergency power units and for other aircraft services that require oxygen. Nitrogen-enriched air is used to pressurize and blanket fuel tanks with predominantly inert gas to reduce the risk of fuel tank fires. The need for substantially pure oxygen is especially important for military aircraft. In such aircraft, that operate at high altitudes and that encounter severe manuevering conditions, the crew oxygen system desires a gas of at least 95% oxygen.

Conventional methods of providing oxygen-enriched and nitrogen-enriched air on an enclosed vehicle include storing tanks of gas on the vehicle, and using the oxygen-enriched or nitrogen-enriched gas when needed. The enclosed vehicles have tanks of oxygen-enriched air, such as compressed oxygen-enriched air, compressed oxygen or liquid oxygen, stored on the vehicle. The tanks of gas require recharging after use. This conventional method is expensive, requires extensive recharging facilities and poses a hazard in having compressed gas tanks on the enclosed vehicle.

The disadvantages of the conventional system led investigators to develop on-board systems of generating oxygen-enriched and nitrogen-enriched gas streams that would eliminate the need for extensive compressed air, compressed oxygen or liquid oxygen storage on the enclosed vehicle. Such a system also would eliminate the need for extensive landbased recharging or regenerating stations, and would reduce the space and weight requirements of extensive on-board storage of oxygen or oxygen-enriched air. Preferably, the system and method would provide substantially pure oxygen, such as about 99% or greater oxygen, for the crew and passengers of an aircraft that operates at high altitude or for the crew of an enclosed military vehicle operating in a contaminated atmosphere.

However, these on-board gas enrichment systems possessed disadvantages in regard to size and weight requirements that are undesirable in an enclosed vehicle. Furthermore, the previously developed systems were capable of generating only either an oxygen-enriched gas or a nitrogen-enriched gas. In addition, the gas generating methods were inefficient, such that the enriched gas stream often included a relatively large concentration of an unwanted gas or a potentially harmful contaminant. Therefore, investigators have continually sought improved on-board gas generation systems to provide an adequate quantity of substantially pure breathing oxygen to the crew and passengers of an enclosed vehicle.

Therefore, on-board gas generating systems have been installed in enclosed vehicles, like aircraft and military vehicles, to simplify the logistics of maintaining stored enriched-gas systems. But the prior on-board gas generating systems were relatively inefficient in that an adequate quantity of substantially pure oxygen was not provided; were bulky and heavy because they required compressors or a series of on-board gas generating units to sufficiently separate the air and generate an adequate supply of oxygen; or required extensive maintenance, such as periodically replacing adsorbents, like zeolites, that preferentially adsorb oxygen over nitrogen. Therefore, in accordance with an important feature of the present invention, a ceramic oxygen separator is used to separate oxygen from air and generate both substantially pure oxygen and nitrogen-enriched air, while overcoming many of the disadvantages found in the prior on-board oxygen generating systems.

The present on-board gas generating system and method continuously provide a sufficient amount of substantially pure oxygen for common enclosed vehicles, like an aircraft, from any convenient air source. Generally, an aircraft has one or more primary engines that provide thrust for the aircraft and pressurized bleed air for the environmental control systems. Turbine-powered aircraft, like other complex aircraft, also require an auxiliary power unit to provide electrical and hydraulic energy, and bleed air, when the primary engine or engines of the aircraft are not in use, for example when the aircraft is on the ground. This bleed air includes a sufficient amount of oxygen for breathing and other purposes if the oxygen content of the bleed air can be separated from the other gaseous components of the air. The separation of oxygen from bleed air is especially important at high altitudes, for example above about 20,000 feet, where modern aircraft often the operate and where the density of the air is too low to provide sufficient breathing oxygen.

It is necessary therefore to equip an aircraft, or other enclosed vehicles, with an on-board oxygen generating system that is capable of operating independent of external conditions, like air density or contaminants present in the air, and that can provide a sufficient amount of oxygen for crew or passenger breathing in an emergency situation, such as in a contaminated atmosphere or at high altitudes. Ideally, such an oxygen generating system is compact, lightweight, reliable, easily maintained and requires no special handling, while providing a continuous and sufficient supply of substantially pure oxygen.

As previously stated, ambient air at a high altitude, or in a contaminated atmosphere, contains a sufficient amount of oxygen for breathing, But the oxygen must be isolated from the ambient air in a sufficient quantity and in a substantially pure form for breathing. Preferably, the substantially pure oxygen also could be stored for later use. Investigators therefore sought methods of isolating oxygen from the ambient air to meet the oxygen quality and quantity requirements with a compact and lightweight apparatus. Consequently, numerous methods and systems were deviced to separate a stream of air having an ambient concentration of oxygen and nitrogen into a usable supply of gas possessing an enhanced oxygen concentration and into a usable supply of gas possessing an enhanced nitrogen concentration.

For example, Manatt in U.S. Pat. No. 4,508,548 disclosed an air separation module based upon the differing permeabilites of oxygen gas and nitrogen gas through a hollow, permeable film. The method utilizes a pressure gradient to separate the oxygen from the nitrogen in air. However, the method provides only moderately oxygen-enriched air, i.e. 35–45% oxygen, whereas ambient air includes about 21% oxygen; and provides nitrogen-enriched air still containing about 9% oxygen. Manatt teaches that such oxygen-enriched air can be used in aircraft for breathing purposes, but no suggestion was made that such moderately oxygen-enriched air is suitable for breathing purposes at a high altitude or in a hostile environment.

In contrast, the on-board oxygen generation system and method of the present invention provide a substantially pure stream of compressed or uncompressed oxygen gas including about 99% or greater oxygen. Furthermore, the substantially pure stream of oxygen is essentially free of contaminants that may be present in the ambient air. The substantially pure oxygen can be used by the crew of military aircraft operating at high altitudes and by the crew of a military vehicle operating in a contaminated atmosphere because the present method and system selectively separate the oxygen from the ambient air, and essentially exclude contaminants present in the air, such as biological and chemical warfare agents.

Benedict, in U.S. Pat. No. 2,609,059, disclosed separating the components of a gas mixture that includes a readily condensable component. Benedict utilizes the differing diffusion velocities of the gaseous components through a diffusion screen, and a cooling column to condense a condensable component of the gas mixture. The condensable component of the gas mixture therefore is separated from the noncondensable, or less readily condensable, components of the gas mixture. The method of Benedict also teaches using several of the disclosed separation units in series to achieve an effective separation of components. Benedict does not teach or suggest the separation of a gas mixture including only noncondensable, or relatively noncondensable components, such as separating air into a substantially pure oxygen stream and a nitrogen-enriched stream. Furthermore, Benedict does not teach or suggest simultaneously separating and compressing a stream of substantially pure oxygen from air.

Garwin, in U.S. Pat. No. 3,250,080, disclosed the fractionation of a gas mixture including components that have a different diffusion rate through a semipermeable membrane. The disclosed method utilizes a pressure gradient to separate the gaseous components over a series of diffusion cells to eventually provide a relatively pure stream of a gaseous component. Garwin does not teach or suggest a method of providing substantially pure oxygen with a single oxygen separation device.

McDonald et al., in U.S. Pat. No. 4,560,394, disclosed an oxygen separation system utilizing a membrane that is relatively more permeable to oxygen than nitrogen. McDonald et al. teach that the oxygen-enriched gas stream can be used for increasing the oxygen content of air for breathing in an aircraft. McDonald et al., however, do not teach a method of providing substantially pure oxygen that can be used for breathing in an enclosed vehicle when ambient air is unsuitable, or contaminated, for breathing purposes. Furthermore, McDonald et al. do not teach or suggest a method of separating an air stream into a compressed oxygen-enriched stream and into a nitrogen-enriched gas stream.

Glenn et al., in U.S. Pat. No. 4,681,602, disclosed a method of separating bleed air into an oxygen-enriched gas. The Glenn et al. method utilizes at least two air separators to provide either a sufficiently oxygen-enriched gas stream including 90–95% oxygen or a sufficiently oxygen-depleted gas stream. Glenn et al. do not teach or suggest a gas generating system or method that provides a substantially pure and compressed oxygen gas stream and a sufficiently nitrogen-enriched gas stream by utilizing a single oxygen separator.

Fee et al., in U.S. Pat. No. 4,877,506, disclosed a ceramic oxygen separator having a particular corrugated configuration. Fee et al. teach that the corrugated oxygen separator can purify air in an enclosed space. Fee et al. do not teach or suggest the use of a ceramic separator on an enclosed vehicle to provide a compressed oxygen-enriched gas stream and nitrogen-enriched gas stream from ambient air.

Another type of oxygen generator is discussed in *Aviation Week and Space Technology*, pp. 56–57, (Feb. 3, 1980). This publication described an adsorption-desorption interaction between oxygen and a molecular sieve to provide breathing oxygen for an aircraft crew. The method utilizes a molecular sieve, such as a zeolite, to preferentially adsorb the oxygen in the bleed air over the nitrogen, and therefore store the oxygen for later use.

Therefore, in summary, methods and systems have been developed to separate a mixed gas stream, like air, into its component parts. The prior methods and systems utilized to separate an air stream into an oxygen-enriched stream and a nitrogen-enriched stream were heavy and bulky, or required a series of separators to provide an adequate amount of substantially pure oxygen for breathing at a high altitude or in a contaminated atmosphere. Other methods utilized tanks of compressed air or oxygen, or utilized an oxygen adsorbent. But such methods have the disadvantages of requiring storage tanks that are heavy and bulky, and depending upon landbased recharging and regenerating stations.

Therefore, the continuous generation of oxygen or oxygen-enriched air on-board an enclosed vehicle eliminates the need for recharging facilities at each base. Logistics are thereby simplified. Furthermore, until the system and method of the present invention, the prior methods also required an on-board compressor to compress the oxygen or oxygen-enriched gas stream if storage of the oxygen was desired. Therefore, in accordance with an important feature of the present invention, a substantially pure stream of oxygen gas, including about 99% or greater oxygen, is generated continuously on-board an enclosed vehicle from an atmospheric air source, such as bleed air, ram air or unpressurized ambient air. The method selectively separates the oxygen from the air source, thereby essentially excluding a contaminating or noxious agent in the air supply from the breathing oxygen. The generated stream of substantially pure oxygen can attain a pressure of up to about 10,000 psi (pounds per square inch), thereby eliminating the need for an on-board compressor to compress the substantially pure stream of oxygen. The substantially pure oxygen can be used as it is generated, or, if desired, can be stored for later use, such as breathing or to start and maintain combustion in an emergency power unit.

SUMMARY OF THE INVENTION

In accordance with the present invention, a method of generating a stream of compressed or uncompressed, substantially pure oxygen on-board an enclosed vehicle, without the use of a compressor, provides a continuous oxygen source that can be used for breathing by the crew of passengers of the enclosed vehicle either in emergency situations, such as in a contaminated atmosphere, or in normal situation.

More particularly, a system for providing a continuous supply of substantially pure and, if desired, compressed breathing oxygen to the crew or passengers of an enclosed vehicle includes an oxygen separator having an input that receives feed air and an output at which oxygen is developed; and means for interconnecting the oxygen separator and an enclosed space of an enclosed vehicle and operative in response to a command to transfer compressed oxygen to the enclosed space. Optionally, if compressed oxygen is generated, the system includes a storage tank to store a supply of the compressed and substantially pure oxygen.

Preferably, the oxygen separator is a ceramic-type oxygen separator that operates at an elevated process temperature; and the system further includes means coupled to the separator output for cooling the compressed or uncompressed oxygen prior to using the oxygen or prior to storing the oxygen in the storage tank. The ceramic type oxygen separator can be configured to generate compressed or uncompressed oxygen. To achieve the full advantage of the present invention, the means for cooling the oxygen prior to storage is a heat exchanger that places the oxygen in heat transfer relationship with the feed air. The oxygen separator also can include a second output at which nitrogen-enriched air is developed, and the system can include a further heat exchanger coupled to the second output that places the nitrogen-enriched air in heat-transfer relationship with the feed air.

In accordance with an important aspect of the present invention, the on-board oxygen generation system and method are utilized to separate, and simultaneously compress, oxygen present in air, and thereby provide a compressed oxygen-enriched gas stream and a nitrogen-enriched gas stream. The on-board oxygen generation system and method produce an oxygen-enriched stream including substantially pure oxygen, such as about 99% or greater oxygen, and if desired, having a pressure of up to about 10,000 psi. Therefore, a separate on-board compressor to compress the oxygen-enriched gas stream for storage is obviated. In addition, the substantially pure oxygen can be generated in a non-compressed form by altering the configuration of the oxygen separator. In many instances, the generation of non-compressed oxygen is preferable for crew or passenger breathing.

The high-purity oxygen stream and the absence of a compressor makes the oxygen generation system and method of the present invention ideal for use in an enclosed vehicle, like an aircraft or a military tank, as a means to supply substantially pure oxygen to the crew or passengers for breathing, especially at high altitudes or in a contaminated atmosphere. The stream of oxygen-enriched air is sufficiently pure to provide a safe and adequate supply of oxygen for crew and passenger breathing; and the apparatus, absent a compressor, is sufficiently compact and lightweight for use in an enclosed vehicle.

In accordance with a further aspect of the present invention, the oxygen generation system and method utilize engine bleed air, ram air or air from another suitable source, including unpressurized ambient air, as the feed stream. The feed stream is heated to a temperature of about 500° C. and is fed into a ceramic oxygen generator that can also serve as the compressor. An electrical potential of up to about 2 volts applied across the ceramic oxygen generator separates the oxygen gas in the feed stream from the nitrogen gas, and the oxygen gas is pumped through an oxygen-conducting ceramic, like, for example, zirconia, hafnia, ceria or bismuth oxide. A ceramic-type oxygen separator, including the oxygen-conducting ceramic, is disclosed in Joshi, U.S. Pat. No. 4,879,016, hereby incorporated by reference. The method is selective in that essentially only the oxygen in the feed stream is separated from the feed stream. Accordingly, an oxygen-enriched gas stream, either compressed or uncompressed, and a nitrogen enriched gas stream are generated by the ceramic oxygen separator. A high pressure oxygen gas stream can be generated because a voltage gradient rather than a pressure gradient is used to drive the process of separating oxygen from the heated feed stream of air.

In accordance with a preferred embodiment of the present invention, both the compressed oxygen-enriched stream and the nitrogen-enriched stream are collected and stored on the enclosed vehicle for future use. For example, the substantially pure oxygen can be stored, then used as an immediate source of oxygen in an emergency situation. The on-board gas generator then can be engaged to provide a continuous source of substantially pure oxygen. The nitrogen-enriched stream can be fed to the fuel tanks to serve as an inert blanket over the fuel.

Further in accordance with the preferred embodiment, the substantially pure oxygen stream and the nitrogen-enriched stream exiting from the oxygen separator have a temperature of at least about 500° C. Therefore, both hot gas streams are passed through heat transfer units such that the enriched gas streams are cooled, and the heat extracted from the enriched gas streams is used to heat the feed stream entering the oxygen separator.

In accordance with a further aspect of the present invention, an improvement in an enclosed vehicle environmental system includes an oxygen separator, such as a ceramic-type oxygen separator, to derive compressed, substantially pure oxygen from feed air provided to the oxygen separator without the use of a compressor; and means coupled between the oxygen separator and an enclosed space within the enclosed vehicle for delivering the compressed oxygen to the enclosed space for breathing purposes by the crew or passengers.

In accordance with a still further aspect of the present invention, a method of providing substantially pure oxygen to an enclosed space in an enclosed vehicle includes providing an oxygen separator, like a ceramic-type oxygen separator, on-board the enclosed vehicle; supplying feed air to the oxygen separator; operating the oxygen separator as feed air is supplied to the oxygen separator so that the oxygen separator produces substantially pure oxygen and, if desired, in compressed form; and introducing the oxygen to an enclosed space of the enclosed vehicle. Optionally, the substantially pure oxygen is stored in the compressed form on-board the enclosed vehicle.

In accordance with this aspect of the present invention, the feed air is heated before the feed air is supplied to the oxygen separator and the substantially pure oxygen is cooled before the oxygen is used or stored. To achieve the full advantage of the present invention, a heat exchanger cools the substantially pure oxygen, and the extracted heat is utilized to heat the feed air. Further, in this aspect of the invention, a nitrogen-enriched air stream also is produced by the oxygen separator and is cooled by a second heat exchanger, whereby the extracted heat also is used to heat the feed air. The cooled nitrogen-enriched air is stored in an aircraft fuel tank.

The present invention does not rely upon a pressure gradient or a preferential adsorption-desorption to separate the oxygen from an ambient air stream. The present invention utilizes a voltage gradient to provide, if desired, substantially pure oxygen up to pressures of about 10,000 psi. Therefore, a separate on-board compressor is not required to compress the substantially pure oxygen stream. The mechanism of oxygen separation is the transport of oxygen, in the form of oxide ions, across a ceramic membrane when a voltage potential is applied to electrodes coated on the ceramic membrane. The nitrogen and argon in the air stream do not pass through the ceramic membrane. The ceramic membrane is highly-selective and, accordingly, essentially only oxide ions migrate through the ceramic. Therefore, essentially only oxygen is separated from the air stream, resulting in a substantially pure oxygen stream and a nitrogen-enriched by-product stream. Consequently, the selective ceramic oxygen separator also effectively excludes a contaminant in the air stream from contaminating the substantially pure oxygen. Accordingly, the on-board oxygen generation system and method of the present invention are ideally-suited for use on an enclosed vehicle to provide substantially pure and compressed oxygen for breathing purposes.

As will be discussed more fully hereinafter, the oxygen generation system and method demonstrate the advantages of quickly and continuously providing high purity oxygen for crew and passenger breathing in an enclosed vehicle; of providing highly compressed oxygen thereby precluding the need for an on-board compressor; of generating substantially pure and compressed or uncompressed oxygen on-board, thereby eliminating extensive on-board compressed air storage and landbased recharging stations; of utilizing bleed air, ram air or unpressurized ambient air as a source for the feed gas; and of utilizing a highly selective and a relatively lightweight oxygen separator that is substantially free of maintenance.

BRIEF DESCRIPTION OF THE DRAWINGS

The FIGURE is a block diagram of an oxygen generation system for installation on an enclosed land vehicle to generate a substantially pure and compressed oxygen stream, and a nitrogen-enriched gas stream.

DESCRIPTION OF THE PREFERRED EMBODIMENT

Referring now to the FIGURE, a preferred embodiment of the on-board oxygen generation system and method of the present invention is depicted in an on-board installation on a turbine-powered aircraft. This embodiment, and other embodiments, also can be installed on other enclosed vehicles, such as military tanks, armored personnel carriers, and other wheeled and tracked vehicles that can be used in a contaminated atmosphere, such as an atmosphere that includes oxygen in addition to potentially harmful agents, like biological agents or a chemical compound.

More particularly, the turbine-powered aircraft has at least one turbine-powered main engine 10 and at least one fuel tank 12 for providing fuel to the main engine 10 by line 66. As is well known, a portion of the engine compressor flow can be used as bleed air for conventional purposes. This bleed air, along line 24, also can be used as the feed air that ultimately provides the substantially pure oxygen. Alternatively, ambient ram air or unpressurized ambient air from line 26 can be used as the feed air that ultimately provides the substantially pure oxygen.

In general, the feed air that ultimately provides the substantially pure oxygen can be supplied from any convenient source. However, bleed air from line 24 or ram air from line 26 are preferred sources for the feed air. To achieve the full advantage of the present invention, the feed air is bleed air supplied by main engine 10 through line 24. The bleed air generally has a temperature in the range of from about 50° C. to about 450° C. as it exits the main engine 10. As will be discussed more fully hereinafter, the feed air then is heated to a temperature of at least about 500° C., such as by heat transfer units 38 and 44 and heater 62, before the feed air is separated into a substantially pure oxygen gas stream and a nitrogen-enriched gas stream by an air separator 28.

The heated feed air is introduced into the air separator 28 by line 30. The feed gas passing through line 30 has a temperature in the range of from about 400° C. to about 1000° C., and preferably in the range of from about 600° C. to about 900° C. If the feed gas in line 30 is insufficiently heated, a heater 62 can be engaged to increase the temperature of the feed gas to the desired level. In addition, the air separator 28 also is operated at an elevated temperature, such as from about 400° C. to about 1000° C. Therefore, the air separator 28 also serves to heat the air stream after the air separator 28 has been engaged and attained its operating temperature. When the air separator 28 has attained its operating temperature, heater 62 can be disengaged. The feed air enters air separator 28 from line 30 at a pressure of from about one psi, when unpressurized ambient air at a high altitude is used as the feed air; to about 300 psi.

A voltage gradient is applied across the air separator 28 by a voltage source 32 such that the oxygen in the feed air is reduced to oxide ions at a cathode in the air separator 28 by a four electron transfer. The oxide ions are driven by the applied voltage to an anode of the air separator 28 through an oxygen-conducting ceramic, like a zirconia, hafnia, ceria or bismuth oxide, separating the cathode and the anode of the air separator 28. The nitrogen and the argon in the feed gas are not affected by the voltage source. Likewise, various contaminants that may be present in the feed gas also will not be affected by the voltage source. Furthermore, even if a particular contaminant in the feed air can be reduced at the cathode, the reduced-form of the contaminant, and nitrogen and argon, are incapable of migrating through the selective oxygen-conducting ceramic layer.

At the anode of the air separator 28, the oxide ions are oxidized back to oxygen by a four electron transfer. Therefore, because the inert gas content of the feed air, i.e. nitrogen and argon, and a variety of contaminants, are not reduced at the cathode, they do not migrate through the oxygen-specific ceramic layer; and because the ceramic is highly selective to oxide ion transport, contaminants in the feed air, even if reduced at the cathode, do not contaminate the generated oxygen. Accordingly, the feed air is separated into a substantially pure and uncontaminated stream of oxygen, including about 99% or greater oxygen, and a nitrogen-enriched stream by the air separator 28.

The substantially pure oxygen stream exiting the air separator 28 via output 34 can have a pressure of up to about 10,000 psi. It has been found that a ceramic type air separator having a tubular configuration is more amenable for compression of the oxygen stream. However, various configurations can produce an uncompressed oxygen stream. This oxygen pressure exiting the air separator can be sufficient such that an on-board compressor is not necessary to compress the oxygen gas stream exiting the output 34. A ceramic-type of oxygen separator is preferred because a ceramic oxygen separator is compact, lightweight, operates at a low voltage, and is capable of simultaneously producing high-purity oxygen and compressing the oxygen without the extensive equipment or dangers associated with other oxygen separators or generators.

The substantially pure stream of oxygen exiting air separator 28 via output 34 has a temperature of at least 500° C. and, if desired, a pressure of up to about 10,000 psi. The oxygen stream then is directed to a first heat transfer unit 38 by line 40. Within the first heat transfer unit 38, the oxygen stream and the feed air are placed in a heat transfer relationship. Heat is extracted from the stream of substantially pure oxygen, and the extracted heat is used to heat the feed air that also passes through the first heat transfer unit 38. The substantially pure and compressed oxygen then exits the first heat transfer unit 38 via output 42 for storage in oxygen storage tank 18. If the stream of substantially pure oxygen is insufficiently cooled after exiting the first heat transfer unit 38, a chiller 44 can be engaged to further cool the substantially pure compressed oxygen stream prior to storage in the oxygen storage tank 18.

The substantially pure and compressed oxygen stored in oxygen storage tank 18 then can be fed into an enclosed space 60, like an aircraft cockpit or cabin, by line 46 and valve 64 for use by the aircraft crew and passengers. Valve 64 adjusts the pressure of the substantially pure oxygen stream to a suitable level for breathing. Alternatively, oxygen storage tank 18 can be omitted and the substantially pure oxygen can be fed directly to the enclosed space 60 through line 46 and valve 64, such as through a breathing regulator, like a mask.

Similarly, the stream of nitrogen-enriched air exiting air separator 28 is directed to a second heat transfer unit 44 by line 46. The heated stream of nitrogen-enriched gas is cooled by the second heat transfer unit 44, and the extracted heat is used to further heat the stream of feed air that passes through the second heat transfer unit 44. The cooled stream of nitrogen-enriched air exiting the second heat transfer unit 44 via output 48 can be directed to fuel tank 12 by line 50, by control valve 52 and line 54 to provide an inert blanket over the fuel in fuel tank 12.

The nitrogen-enriched air has an oxygen content well below the usual 21%, such as about from 5% to about 9% oxygen, and therefore will not support combustion. The nitrogen-enriched air is introduced to the fuel tank 12 such that a combustion supporting mixture of oxidant and fuel vapor cannot exist within the fuel tank 12, and any fire hazard associated therewith is eliminated. Alternatively, the stream of nitrogen-enriched air can be stored in nitrogen storage tank 56 or can be vented overboard by line 58.

Therefore, it was observed that the above-described system and method provide a substantially pure stream of oxygen in a compressed or uncompressed form without the need for a compressor. The substantially pure oxygen, including about 99% or greater oxygen, is available as a safe and adequate source of breathing oxygen for the crew or passengers of an enclosed vehicle operating at a high altitude or in a contaminated atmosphere. The present invention eliminates the land-based problems involving the storage of compressed air, oxygen or oxygen-enriched air; the on-board problems of bulky and heavy compressed air or compressed oxygen tanks and compressors; and the problem of recharging spent compressed gas tanks on the ground. The present invention provides for the continuous on-board generation of high purity and compressed oxygen from bleed air or ram air without the need of a compressor. Accordingly, substantially pure oxygen is generated continuously, and in a compressed or uncompressed form, for breathing use by the crew and passengers of an enclosed vehicle, such as an aircraft, an armored personnel carrier or a military tank.

We claim:
1. A method of supplying compressed, substantially pure gaseous breathing oxygen to an enclosed spaced of an enclosed vehicle, comprising the steps of:
   providing oxygen separating means for separating oxygen on-board the enclosed vehicle, said oxygen separating means having an input to receive heated feed air and an output at which the compressed, substantially pure breathing oxygen is derived;
   supplying the heated feed air to the oxygen separating means;
   operating the oxygen separating means as the heated feed air is supplied thereto with the oxygen separating means producing compressed, substantially pure oxygen gas without the use of a compressor;
   cooling the oxygen gas before the oxygen gas is introduced into the enclosed space; and
   introducing the oxygen gas to the enclosed space.

2. The method of claim 1, wherein the oxygen separating means comprises a ceramic oxygen separator.

3. The method of claim 1, wherein the cooling step comprises the step of using the feed air to cool the oxygen gas in a heat exchanger.

4. The method of claim 1, including the further step of storing the oxygen after the oxygen gas is cooled.

5. The method of claim 1, wherein the enclosed vehicle includes an inlet into which ram air flows and the step of supplying comprises the step of direction heated ram air.

6. The method of claim 1, wherein the oxygen separating means produces a second stream of gaseous nitrogen-enriched air and including the further step of storing the gaseous nitrogen-enriched air in a fuel tank.

7. An environmental system for an enclosed vehicle, comprising:
   means for separating compressed, substantially pure oxygen gas from feed air provided thereto, said oxygen separating means having an input to receive the feed air and an output at which the compressed substantially pure oxygen gas is derived without the use of a compressor;

a heat exchanger coupled between the output of the oxygen separating means and an enclosed space of the enclosed vehicle, said heat exchanger having first and second portions in thermal contact with one another wherein the first portion receives and heats the feed air and delivers it to the input of the oxygen separating means and wherein the second portion receives and cools the compressed, substantially pure oxygen gas from the output of the oxygen separating means; and means coupled between the second portion of the heat exchanger and the enclosed space within the enclosed vehicle for delivering the oxygen gas to the enclosed space to provide breathing oxygen.

8. The environmental system of claim 7, wherein the oxygen separating means comprises a ceramic oxygen separator.

9. The environmental system of claim 7, further including means coupled between the output of the second portion of the heat exchanger and the enclosed space for storing the substantially pure oxygen gas in compressed form.

10. The environmental system of claim 7, wherein the oxygen separating means produces gaseous nitrogen-enriched air at a second output and further including means for storing the gaseous nitrogen-enriched air.

11. The environmental system of claim 10, wherein the storing means comprises a fuel tank.

12. The environmental system of claim 10, further including a second heat exchanger having first and second portions in thermal contact with one another wherein the first portion receives the feed air and delivers it to the input of the oxygen separating means and wherein the second portion is coupled between the second output of the oxygen separating means and the storing means.

13. A system for providing breathing oxygen to an enclosed vehicle, comprising:

means for separating oxygen from feed air at a high process temperature, said separating means having an input that receives the feed air and an output at which compressed, cooled and substantially pure oxygen gas is developed without the use of a compressor;

a heat exchanger coupled between the output of the separating means and an enclosed space of the enclosed vehicle, said heat exchanger having first and second portions in thermal contact with one another wherein the first portion receives and heats the feed air and delivers it to the input of the separating means and wherein the second portion receives and cools the compressed, substantially pure oxygen producing compressed, substantially pure oxygen gas without the use of a compressor;

cooling the oxygen gas before the oxygen gas is introduced into the enclosed space; and introducing the oxygen gas to the enclosed space.

14. The system of claim 13, wherein the oxygen separating means comprises a ceramic oxygen separator.

15. The system of claim 13, including a storage tank to store the compressed oxygen gas coupled between the output of the oxygen separator and the enclosed space.

16. The system of claim 13, wherein the oxygen separating means includes a further output at which gaseous nitrogen-enriched air is produced.

17. The system of claim 16, including a further heat exchanger coupled to the further output, said heat exchanger having first and second portions in thermal contact with one another that place the gaseous nitrogen-enriched air in the heat-transfer relationship with the feed air to cool the gaseous nitrogen-enriched air and to heat the feed air.

* * * * *